April 22, 1952                H. E. ROSE                2,593,612
                              FUSE VALVE
Filed April 29, 1944                              2 SHEETS—SHEET 1
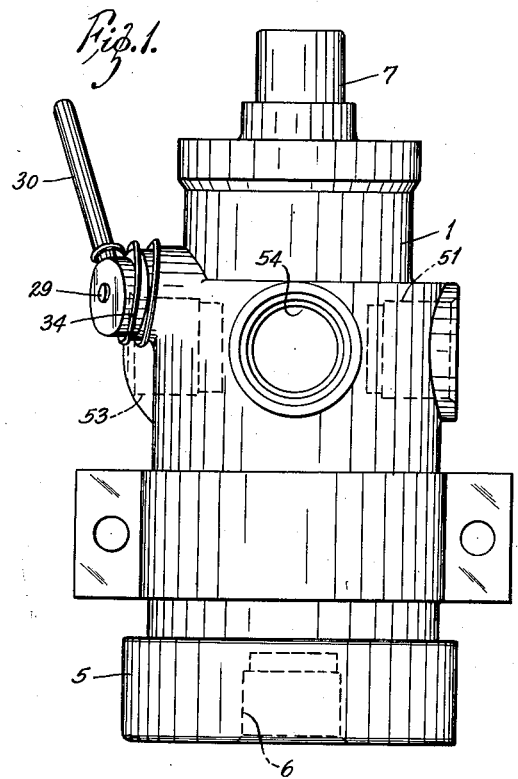
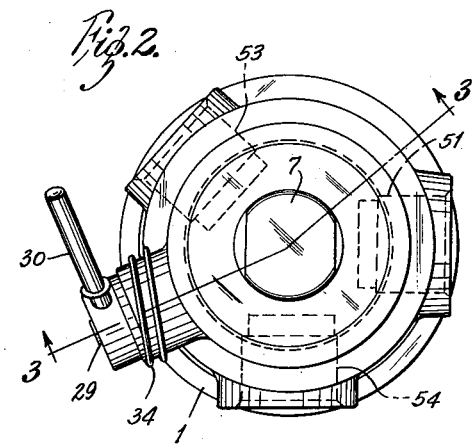
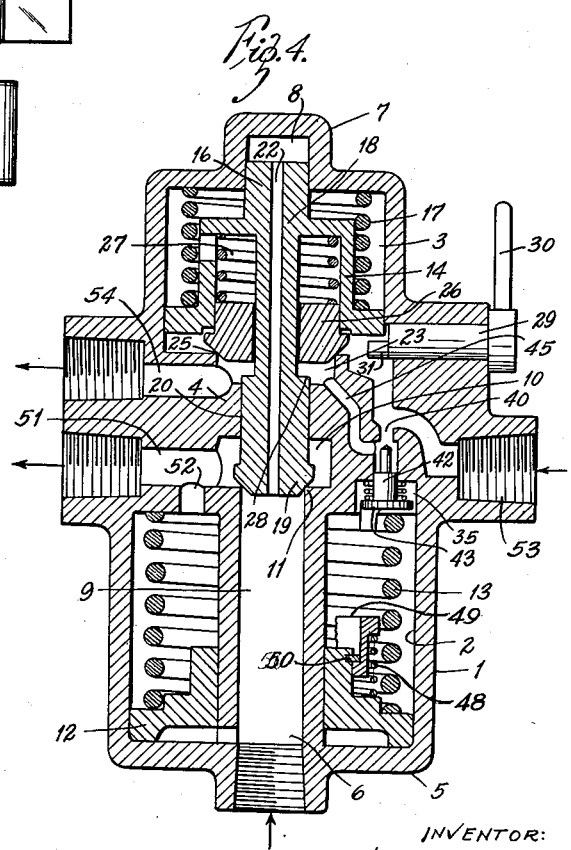
INVENTOR:
HOWARD E. ROSE,
By Kingsland Trevor Ezell
ATTORNEYS.

April 22, 1952 H. E. ROSE 2,593,612
FUSE VALVE
Filed April 29, 1944 2 SHEETS—SHEET 2
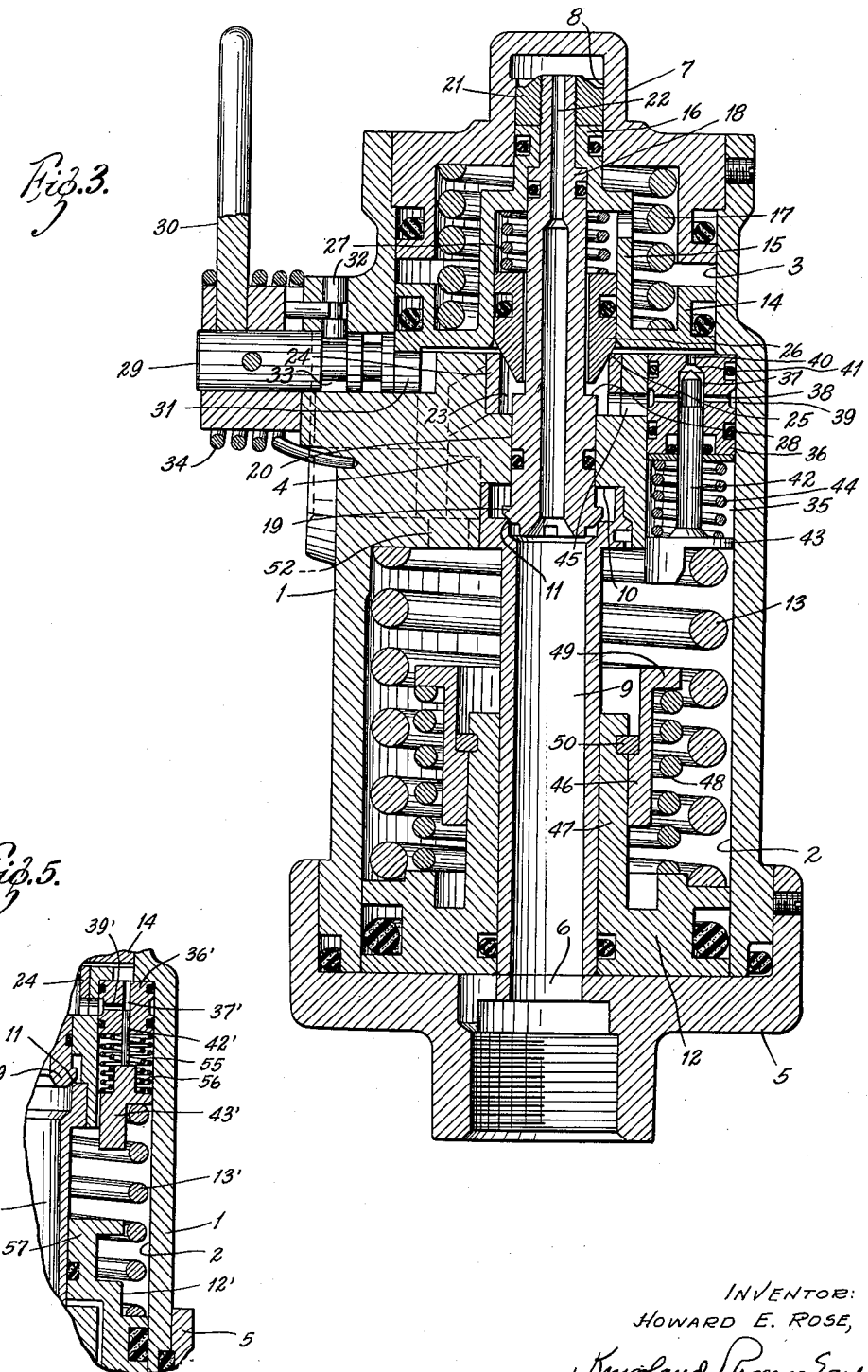
INVENTOR:
HOWARD E. ROSE,
By Kingsland, Rogers & Ezell
ATTORNEYS.

Patented Apr. 22, 1952

2,593,612

UNITED STATES PATENT OFFICE 2,593,612

FUSE VALVE

Howard E. Rose, Peninsula, Ohio, assignor to Alco Valve Company, University City, Mo., a corporation of Missouri Application April 29, 1944, Serial No. 533,268

26 Claims. (Cl. 121—47)

This invention relates to a fuse valve, and more particularly to fuse valves which are so associated with pressure supply and return conduits of a fluid pressure system that in the event of leaky or ruptured conduits the conduits will automatically become closed to prevent loss of fluid.

An object of the invention is to produce an improved fuse valve which will automatically operate to close both a fluid pressure supply conduit and a return conduit when there is a rupture of a conduit between the valve and the device being operated by fluid pressure.

Another object is to embody an improved bypass arrangement in a fuse valve which will be so associated with the return conduit of the system that fluid cannot be trapped in said return conduit to prevent fusing of the valve when a rupture occurs in the pressure supply conduit.

A further object is to so arrange a control valve for the bypass that it will be moved to close the bypass after fusing takes place and thus prevent flow of fluid through the bypass.

A further object is to provide means to close the bypass control valve by fluid pressure from the source.

A further object is to employ a spring biased reset piston of a fuse valve as the means for transmitting a force to close off a bypass control valve after fusing takes place.

A further object is to provide a fuse valve with an operator-controlled mechanical reset means to permit conditioning the said fuse valve so that the fluid pressure system, with which the valve is associated, can be primed when first installed or after servicing.

A further object is to produce a fuse valve which is economical to manufacture and so constructed that a minimum number of seals will be employed to prevent leakage from the interior of the valve casing.

In the drawings:

Fig. 1 is a side view of an improved fuse valve;

Fig. 2 is a top view of said valve;

Fig. 3 is a longitudinal sectional view showing details of the valve construction, said view being taken on the line 3—3 of Fig. 2;

Fig. 4 is a schematic sectional view of the valve showing the principal parts; and Fig. 5 is a sectional view showing a modified control valve for the bypass.

Referring to the drawings in detail, and first to Figs. 1–3, the improved fuse valve, as shown, comprises a casing member 1, provided with a lower bore 2 and a smaller upper bore 3, said bores being divided by a partition 4. The lower bore is closed by a cap 5 having a central port 6 which forms the pressure inlet for the valve, said port being connected to a conduit coming from a suitable source of fluid pressure. The upper bore is also closed by a cap 7 in which is provided a small bore 8. The cap 5 for the lower bore carries a tubular extension 9 which extends upwardly through the bore 2 and opens into a chamber 10 in the partition 4. The upper end of this tube is provided with a valve seat 11. Within the bore 2 is positioned an annular piston 12, hereinafter referred to as a reset piston, which has associated therewith a spring 13 for normally biasing the piston to a position wherein it engages the cap 5.

Within the upper bore 3 is positioned a piston 14 which is provided with stepped cylindrical extensions 15 and 16, the latter extending into the bore 8 in the cap 7. A spring 17 normally biases the piston 14 toward the partition 4. A stem 18 is secured to the extension 16 and projects downward through the extension 15. This stem is provided on its lower end with a valve element 19 for cooperation with the previously referred to valve seat 11 on the upper end of the tube 9. The stem is guided in a bore 20 in the partition 4 and a nut 21 secures the stem to the extension 16 of the piston 14. The stem is provided with a passage 22 extending completely therethrough so as to place the tube 9 in continuous communication with the closed end of the bore 8 and permit equal fluid pressures to act upon both ends of the stem.

Above the bore 20 in the partition which guides the stem there is provided a second chamber 23 which has a cylindrical liner 24 providing a valve seat 25 at its upper end. Cooperating with this valve seat is a valve element 26 slidably mounted upon the stem 18, said valve element being biased toward its seat by a spring 27. The stem is arranged with a shoulder 28 whereby, after a predetermined free upward movement of the valve element 19 and the stem, said stem can pick up and unseat the valve element 26.

The casing has journaled therein a shaft 29 and on its outer end is a handle 30 for turning the shaft. The inner end of this shaft projects in the lower end of the bore 3 and is provided with an eccentric portion 31 for engaging and moving the piston 14 and the attached stem 18 upwardly so as to unseat the valve elements 19 and 26 by manual effort. The shaft is held in the casing by a pin 32 which extends into an annular groove 33 in the shaft. A coil spring 34 is associated with the handle for biasing the shaft to a predetermined position, said position being such that the piston 14 will be adjacent the partition, as shown in Fig. 3. The coil spring has one end connected to the lever and the other end connected to the casing.

On the side of the casing opposite the shaft 29 the partition is provided with a bore 35, the upper end of which communicates with the lower end of the bore 3 in the casing, and the lower end of which opens into the bore 2 of the casing. In this bore is a piston element 36 provided with an axial passage 37, and a cross passage 38, said cross passage communicating with an annular groove 39 in the surface of the element 36. The axial passage 37 communicates through a small orifice 40 with the bore 3 below the piston 14 and associated with this orifice is a valve seat 41. A valve element 42 having a conical end for engaging the valve seat 41 is slidable in the axial passage. The valve element 42 is provided with a head 43 spaced from the piston element 36; and interposed between this head and the piston element is a spring 44 which normally maintains the valve element unseated so that fluid can flow through the orifice and the cross passage 38. A passage 45 in the partition and liner 24 permits communication from the cross passage 38 and groove 39 to the previously mentioned chamber 23 below the valve element 26.

The valve element 42 rests upon the top end of the spring 13, which as previously mentioned is employed to bias the reset piston 12 toward the cap 5. The valve element is arranged to be moved to a seated position to close off the orifice 40 by movement of the piston 12 in the bore 2. The structure employed to bring about this closing comprises a sleeve 46 slidably mounted upon an extension 47 of the piston 12. A spring 48 is interposed between a flange 49 on this sleeve and the piston, said spring acting to maintain the sleeve against a ring 50 carried by the end of the extension 47. The arrangement is such as to provide a yieldable member carried by the piston 12 for closing the valve element 42. Upward movement of the piston 12 results in the sleeve's engaging the head 43 of the valve element 42 to move it to closed position. After closing the valve, the piston 12 is permitted to overrun the sleeve by compressing the spring 48.

In addition to the pressure inlet port 6 provided in the cap 5 of the casing, there is also provided a pressure outlet passage 51 (Figs. 1 and 2, and diagrammatically in Fig. 4) which is to be connected by a conduit to the device to be actuated by fluid pressure, such as a double acting fluid motor. The passage 51 communicates with the chamber 10 above the valve element 19, and also with the upper end of the bore 2 by a passage 52. The casing also has a return inlet passage 53 which communicates with the lower end of the bore 3 below the piston 14, and a return outlet passage 54, which communicates with the chamber 23 below the valve element 26. The arrangement of the return inlet and outlet passages with respect to the valve element 26 is such that this valve element controls the return conduit from the device being actuated; it being understood that the return inlet passage is connected to that part of the return conduit coming from the actuated device and the return outlet passage is connected to that portion of the return conduit which leads back to the reservoir.

Suitable seals are associated with the various parts of the valve, said seals being shown in Fig. 3. In this connection, it is to be particularly noted that only three seals are necessary between the interior and exterior of the casing (disregarding conduit connections). These seals are the two cap seals and the shaft seal.

*Operation*

Referring now to the schematic view of Fig. 4, wherein the main parts of the valve are shown and referred to by the same numerals as used in Fig. 3, the operation of the valve will be described.

When there is no pressure in the system with which the fuse valve is associated, the parts will be in the positions shown in Fig. 3. During filling of the system with fluid, the handle 30 is turned so as to move the piston 14 upwardly and open the valve elements 19 and 26, thus permitting fluid to flow through the valve element from the pressure source to the actuated device and return. Thus the system can be bled to free it of air. The fluid will fill the bore 2 above the piston 12, the chamber 10, the several outlet and inlet ports, the chamber 23, the bore 3 below the piston 14, and the space within the cap above the stem 18.

Thereafter, when there is fluid under pressure being transmitted from the source, introducing high pressure to the inlet 6, and the valve elements are in the positions shown in Fig. 3, the reset piston 12 will move upwardly. This high pressure fluid will act at three points in the mechanism. It will act below the valve element 19, and with equal force above the stem 18. Consequently the valve will not open as a result of application of high pressure on its inlet surface. The high pressure will act below the piston and place the previously filled fluid in the bore 2 at the rear of the reset piston 12 under pressure, and transmit it through the passage 52 to the pressure outlet 51, and to the device to be actuated, which, as mentioned, may be a double acting fluid motor. If movement of the piston 12 upwardly is sufficient it will also cause the sleeve 46 to engage and move the valve element 42 to close the orifice 40, thus cutting off the bypass around the valve element 26.

Upon actuation of the movable element of the fluid motor, fluid under pressure will be forced back through the return inlet 53 into the lower end of the bore 3 below the piston 14. The returning fluid will act upon the piston 14 and move it upwardly, and, since the stem 18 is connected to the piston, it also will be moved upwardly. The result will be the opening of the valve 19 so that fluid under pressure from the source can flow directly through the valve element to the fluid motor being actuated. After opening of the valve element 19 the stem 18 will pick up the valve element 26 and also move it to an open position. Consequently there will also be free communication through the valve from the return inlet passage to the return outlet passage. After the valve element 19 is opened, there will be equal pressure on both sides of the reset piston and the spring 13 will be effective to return the said piston to the position shown in Fig. 3. This will insure the reopening of the bypass orifice 40 if it has been closed by upward movement of the piston 12.

If the portion of the conduit connected to the pressure outlet passage 51 should become ruptured, there will be a drop in the pressure acting upon the piston 14, and, consequently, the spring 17 will cause it to move downwardly until the valve element 26 is reseated. (As the valve 19 is open at this time, the pressure conditions at the port 52 and beneath the piston 12 will be sufficiently near equal that the piston will be unaffected.) When this valve element 26 reseats, fluid would be trapped in the bore 3 below the piston if it were not for the bypass including the orifice 40. This bypass will permit fluid to flow around the closed valve element 26, and allow the piston 14 to be so moved by the spring 17 that the valve element 19 will become closed to cut off the pressure conduit, thus permitting what is termed fusing of the valve, that is, complete closing of both the supply and inlet conduits. After closing of the valve element 19, the pressure above the reset piston 12 will drop, and that piston will again be moved upwardly to close the bypass, so that fluid can no longer bypass the valve element 26.

If there should be a rupture in that portion of the return conduit connected to the return inlet passage, there will immediately be a drop in pressure in the fluid acting on the piston 14 and, consequently, the spring 17 will become effective to close the valve element 26, thereby cutting off normal flow of fluid through the return conduit. Since the return passage 53 is connected to the conduit which is ruptured, the piston 14 can return to its position shown in Fig. 3, which will also result in the valve element 19 becoming closed. The valve will now be fused. The fluid under pressure, which still enters the pressure inlet passage 6, will now act upon the reset piston 12 and move it upwardly against the bias of the spring 13. In this action, once the valve 19 has seated, the further operation of the actuated motor will be dependent upon the supplying of liquid under pressure by the rising of the piston 12, under inlet pressure. This pressure is always adequate to operate the motor. Hence the motor will continue to cycle until the piston reaches the top of its cylinder. This will cause the sleeve 46 to engage the valve element 42 and close the bypass so that fluid can no longer leak through said bypass from the reservoir to the point of the rupture. It will be noted that in the fusing of the valve under the conditions referred to, the bypass is not useful in preventing trapping of fluid below the piston 14 since no trapping is possible as the return inlet passage is directly connected to the rupture. The bypass, however, will be closed after fusing so as to prevent loss of fluid.

If this fuse valve should be associated with a supply and a return conduit which lead to and return from several actuating devices having control devices associated therewith, and if there is a rupture of a conduit beyond these control valves which will, in effect, disable only one of the devices being operated, then upon fusing of the valve, it is, of course, desirable to be able to still use the devices which have not had their conduits ruptured.

With the valve fused and the bypass closed, the unruptured conduits can still be employed by resetting the fuse valve after the control valve ahead of the rupture is closed. This is accomplished merely by turning the reset handle 30, which action, in turn, will open the valve elements 19 and 26 and fluid under pressure can then pass through the fuse valve from the source to operate the devices connected with the unruptured conduits. As soon as fluid under pressure is forced back through the return conduit, the piston 14 will be acted upon and the valve element 26 will open. The reset handle can now be released and the valve will again function in the manner already described.

If the fuse valve is associated with supply and return conduits, which are connected only to a single actuated device, then, of course, there will be no necessity for resetting the fuse valve after it has once become fused as a result of a rupture of a conduit. When the conduit is repaired, the valve is again reset.

It is to be noted in connection with the bypass control valve that it is closed at a point before the reset piston 12 reaches the partition. This prevents any possibility of false fusing due to highly reduced flows of fluid as might occur under certain conditions. Also false fusing is prevented because of any leaky control valve which is associated with the devices being actuated.

In Fig. 5, there is shown a slightly modified construction wherein the control valve for the bypass around the valve element 26 is of the sliding type instead of the poppet type, as shown in Fig. 3. In this modified construction, like parts are referred to by primed like numerals. The piston element 36' has an axial passage 37' which communicates with the cross passage 39'. The axial passage 37' slidably receives a valve element 42' which has a head 43' resting upon the spring 13' associated with the reset piston 12'. Two coil springs 55 and 56 are interposed between the head 43' and the piston element. These springs normally maintain the valve element 42' in a position wherein the passage 37' can constantly communicate with the cross passage 39'. The piston 12' has an extension 57 which is arranged to engage the head 43' of the valve element to move it upwardly and cut off communication between the passages 37' and 39', thus closing the bypass. In this construction, there is no necessity for a yieldable arrangement for operating the valve element, since it is of the sliding type, and is free to slide on through the passage 37' after the cross passage 39' is cut off, thus permitting the extension 57 to engage the partition and bring the piston 12 to a stop. The function of this modified bypass control valve is the same as that described in connection with the bypass control valve of the preferred embodiment.

What is claimed is:

1. In a valve means for association with a fluid supply conduit leading from a source of fluid pressure to a device to be actuated and having a return conduit interconnecting said device and said valve means, a valve element for closing the pressure supply conduit, a second valve element for closing the return conduit, means for opening said valve elements by fluid pressure in the return conduit and permitting closing by a drop in said pressure, said means embodying means for opening the first valve element prior to the second element and permitting their closing in reverse order, means for creating fluid pressure in the return conduit by fluid pressure from the source and prior to opening of the valve elements, and means operative after closing of the second valve element as a result of a drop in pressure in the return conduit for preventing the trapping of fluid in the return conduit thereby conditioning the valve means for the closing of the first valve element.

2. In a valve means for association with fluid pressure supply and return conduits for a device actuated by fluid pressure from a source, a first valve element for closing the return conduit, a second valve in the supply conduit, means operable by fluid pressure in said return conduit for opening the second valve prior to the first valve and permitting their closing in reverse order when there is a sufficient drop in the pressure in the return conduit, a bypass around the second valve element, valve means for closing said bypass, and means operated in response to difference in fluid pressure on opposite sides of the second valve, when it is closed, to close said bypass valve means.

3. In a valve means for association with a fluid supply conduit leading from a source of fluid pressure to a device to be actuated and having a return conduit interconnecting said device and said valve means, a first valve element for closing the pressure supply conduit, a second valve element for closing the return conduit, means for opening said valve elements by fluid pressure in the return conduit and permitting closing by a drop in said pressure, said means embodying means for opening the first valve element prior to the second element and permitting their closing in reverse order, means for creating fluid pressure in the return conduit by fluid pressure from the source and prior to opening of the valve elements, bypass means for preventing trapping of fluid in the return conduit so that the first valve element can become closed, and means operable by fluid pressure from the source, including valve means, for closing said bypass after the first valve element is closed.

4. In a valve means for association with fluid pressure supply and return conduits for a device actuated by fluid pressure from a source, a cylinder having an inlet at one end and an outlet at the other end for association with the supply conduit, a piston in the cylinder between the inlet and outlet, means biasing the piston toward the inlet and means providing a passage for permitting fluid to flow past the piston from the inlet to the outlet, a valve for the passage, a second valve for the return conduit, a movable member connected to open the first valve prior to the second and permit their closing in reverse order, means for moving said member by fluid pressure in the return conduit, a bypass around the second valve for preventing said valve from trapping fluid so as to prevent seating of the first valve, a poppet valve for the bypass, and means for seating the poppet valve by a movement of the piston when acted on by fluid pressure from the source after the closing of the first valve, said last-named means embodying a yieldable connection between the piston and poppet valve permitting piston movement after closing of said poppet valve.

5. In a valve means for association with fluid pressure supply and return conduits for a device actuated by fluid pressure from a source, a cylinder having an inlet to be connected to the supply conduit coming from the source and an outlet connected to the supply conduit leading to the actuated device, a passageway comprising an axially arranged tube in the cylinder to connect the inlet and outlet, an annular piston between the cylinder wall and the tube and forming a movable wall between the inlet and the outlet, a valve element for the tube, a second valve element for the return conduit, means connecting the said valve elements together including a lost motion connection permitting opening of the first valve prior to the second valve element and their closing in reverse order, and means for opening the valve elements by fluid pressure in the return conduit and permitting their closing when there is a pressure drop.

6. In a valve means for association with fluid pressure supply and return conduits for a device actuated by fluid pressure from a source, a cylinder having an inlet to be connected to the supply conduit coming from the source and an outlet connected to the supply conduit leading to the actuated device, a passageway comprising an axially arranged tube in the cylinder to connect the inlet and outlet, an annular piston between the cylinder wall and the tube and forming a movable wall between the inlet and the outlet, a valve element for the tube, a second valve element for the return conduit, means connecting the valve elements together including a lost motion connection permitting opening of the first valve prior to the second valve element and their closing in reverse order, means for opening the valve elements by fluid pressure in the return conduit and permitting their closing when there is a sufficient pressure drop, a bypass around the second valve element for preventing fluid from being trapped in the return conduit after closing the second valve, a valve for said bypass, and means for closing the bypass valve, operated by fluid pressure entering the cylinder from the source after the first valve element is closed.

7. In a valve means for association with fluid pressure supply and return conduits for a device actuated by fluid pressure from a source, a cylinder having an inlet at one end and an outlet at the other end for association with the supply conduit, a piston in the cylinder between the inlet and outlet, means biasing the piston toward the inlet and means providing a passage for permitting fluid to flow past the piston from the inlet to the outlet, a valve for the passage, a second valve for the return conduit, a movable member connected to open the first valve prior to the second and permit their closing in reverse order, means for moving said member by fluid pressure in the return conduit, a bypass around the second valve for preventing said valve from trapping fluid in the return conduit so as to prevent seating of the first valve, a cut-off valve for the bypass comprising a port and a slidable valve element, and means for moving the slidable valve element over the port after a partial stroke of the piston in the cylinder resulting from fluid pressure from the source acting thereon after closing of the first valve.

8. In a valve means for controlling fluid pressure supply and return conduits for a device actuated by fluid pressure, a valve body having a chamber, a movable wall in the chamber, a spring interposed between one end of the chamber and the wall for biasing the wall toward the other end of the chamber, said chamber having a pressure outlet in the spring side of the wall and an inlet on the other side of the wall, means forming a passage around the wall, a valve element for the passage, a second valve element for controlling the return conduit, means for opening the first valve element prior to the second valve element and permitting their closing in reverse order, said means being controlled by fluid pressure in the return conduit, means forming a bypass around the second valve element, a valve element for closing said bypass, said element being so mounted in the casing as to be supported on a spring when in open position, a spring for normally biasing the bypass valve element open, and means for closing said bypass valve element when fluid pressure entering the pressure inlet moves the movable wall due to the first valve element being closed.

9. In a valve means for association with fluid pressure supply and return conduits for a device actuated by fluid pressure from a source, a valve casing, means comprising a valve element in the casing for closing the pressure supply conduit, means comprising a second valve element in the casing for closing the return conduit, means operable by fluid pressure in the return conduit for opening the first valve and the second valve in the order named and permitting their closing in reverse order when there is a sufficient drop in the pressure in the return conduit, a bypass around the second valve element comprising a bore having an inlet and an outlet, a piston member in the bore provided with a passage for placing the inlet and outlet in communication with each other, a valve element slidable in the piston for shutting off the passage, and means operated in response to pressure in the pressure supply conduit for moving said last-named valve element after the first-named valve element is permitted to close.

10. In a valve means for association with fluid pressure supply and return conduits for a device actuated by fluid pressure from a source, means providing a chamber having an inlet and an outlet for association with the supply conduit, a movable wall in the chamber between the inlet and outlet, means for biasing the wall toward the inlet side of the chamber, a passage around the wall, a valve for said passage, a second valve for the return conduit, means operable by fluid pressure in the return conduit for opening the first valve prior to the second valve and permitting their closing in reverse order when there is a sufficient drop in pressure, a bypass around the second valve, a valve for the bypass, and means for closing the bypass valve by a movement of the wall following a closing of the first valve.

11. In a valve means for association with fluid pressure supply and return conduits for a device actuated by fluid pressure from a source, means providing a chamber having an inlet and an outlet for association with the supply conduit, a movable wall in the chamber between the inlet and outlet, means for biasing the wall toward the inlet side of the chamber, a passage around the wall, a valve for said passage, a second valve for the return conduit, means operable by fluid pressure in the return conduit for opening the first valve prior to the second valve and permitting their closing in reverse order when there is a sufficient drop in pressure, a bypass around the second valve, a valve for the bypass, and yieldable means carried by the movable wall for closing the bypass valve, said yieldable means permitting additional movement of the wall following the valve closing.

12. In a valve means for controlling fluid pressure supply and return conduits for a device actuated by fluid pressure from a source, means comprising a valve element for closing the supply conduit, means comprising a second valve element axially aligned with the first element for closing the return conduit, a fluid motor having a movable element subject to fluid pressure in the return conduit, a stem connecting the movable element with the first valve element to thereby cause opening of said valve element when the movable element is actuated by fluid pressure, means providing a lost motion connection between the stem and the second valve element to permit opening of the second valve element subsequently to the opening of the first valve element and closing in the reverse order when there is a drop in pressure acting on the movable element of the motor, and means for creating fluid pressure in the return line by fluid pressure from the source.

13. In a valve means for controlling fluid pressure supply and return conduits for a device actuated by fluid pressure from a source, a casing, a cylinder in the casing having inlet and outlet ports connected to the supply conduit, a piston in the cylinder between the inlet and outlet ports and the source, a bypass around the piston to permit fluid under pressure to flow through the supply conduit, a valve element for the bypass, means comprising a second valve element for controlling the flow of fluid through the return conduit, said valve elements and piston all being axially aligned in the casing, and means comprising a movable element subject to fluid pressure in the return conduit coming from the actuated device for opening said valve elements.

14. In a valve means for controlling fluid pressure supply and return conduits for a device actuated by fluid pressure from a source, a casing, a cylinder in the casing having inlet and outlet ports connected to the supply conduit, a piston in the cylinder between the inlet and outlet ports and the source, a bypass around the piston to permit fluid under pressure to flow through the supply conduit, a valve element for the bypass, means comprising a second valve element for controlling the flow of fluid through the return conduit, said valve elements and piston all being axially aligned in the casing, a stem connected to the first valve element, a fluid motor operated by fluid pressure in the return conduit and connected for actuating the stem, and connecting means between the stem and the second valve element for opening said element after the first valve element is opened.

15. In a valve means for association with fluid pressure supply and return conduits for a device actuated by fluid pressure from a source, a cylinder having an inlet to be connected to the supply conduit coming from the source and an outlet connected to the supply conduit leading to the actuated device, a bypass comprising an axially arranged tube in the cylinder to connect the inlet and outlet, an annular piston between the cylinder wall and the tube and forming a movable wall between the inlet and outlet, a valve for the bypass, and means for opening the valve by fluid pressure in the return conduit coming from the actuated device.

16. In a valve means for association with fluid pressure supply and return conduits for a device actuated by fluid pressure from a source, a cylinder having an inlet to be connected to the supply conduit coming from the source and an outlet connected to the supply conduit leading to the actuated device, a bypass comprising an axially arranged tube in the cylinder to connect the inlet and outlet, an annular piston between the cylinder wall and the tube and forming a movable wall between the inlet and outlet, a valve for the bypass, a valve for the return conduit, and means for opening both valves by fluid pressure in the return conduit coming from the actuated device.

17. In a valve means for association with a supply conduit between a source of fluid pressure and a device to be actuated and with a return conduit from the device, a casing having two aligned cylindrical bores separated by a partition, pistons in said bores, a supply inlet port communicating with the bore on one side of one piston, a supply outlet port communicating with the bore on the other side of said one piston, means establishing a passage around said one piston, a valve element for controlling the passage, means connecting the valve element to the other piston for actuation thereby, a return inlet port communicating with one side of the other piston whereby fluid pressure in the return inlet can move said other piston and open the valve element, a return outlet port, means establishing a passage between the two return ports, a second valve element for controlling the last-named passage, and means for opening the second valve element by the other piston after said other piston has opened the first valve element.

18. In a valve means for controlling fluid pressure supply and return conduits for a device actuated by fluid pressure from a source, a valve element for closing the supply conduit, a second valve element for closing the return conduit, means for opening the elements by fluid pressure in the return conduit, means for creating fluid pressure in the return conduit by fluid pressure from the source and prior to opening of the first valve element, and operator-operated means for opening the first valve element at will independently of fluid pressure from the source.

19. In a valve means for controlling fluid pressure supply and return conduits for a device actuated by fluid pressure from a source, a valve element for closing the supply conduit, a second valve element for closing the return conduit, means for opening the elements by fluid pressure in the return conduit, means for creating fluid pressure in the return conduit by fluid pressure from the source and prior to opening of the first valve element, and a hand-operated member connected to the first valve element for opening at will said element by operator effort independently of fluid pressure from the source.

20. In a valve means for controlling fluid pressure supply and return conduits for a device actuated by fluid pressure from a source, a valve element for closing the supply conduit, a second valve element for the return conduit, a fluid motor having a movable element connected to open both valve elements, means for operating said fluid motor by fluid pressures in the return conduit, means for creating fluid pressure in the return conduit by fluid pressure from the source and prior to opening of the first valve element, and operator-operated means connected to the movable element of the fluid motor for opening at will by operator effort said first valve element independently of fluid pressure from the source.

21. In a valve means for association with a supply conduit between a source of fluid pressure and a device to be actuated and with a return conduit from the device, a casing having two aligned cylindrical bores separated by a partition, pistons in said bores, a supply inlet port communicating with the bore on one side of one piston, a supply outlet port communicating with the bore on the other side of said one piston, means establishing a passage around said one piston, a valve element for controlling the passage, means connecting the valve element to the other piston for actuation thereby, a return inlet port communicating with one side of the other piston whereby fluid pressure in the return conduit can move said piston and open the valve element, a return outlet port, means establishing a passage between the two return ports, a second valve element for controlling the last-named passage, means for opening the second valve element by the other piston after said other piston has opened the first valve element, and an operator-operated member for moving at will by operator effort the said other piston to open the first valve element.

22. In a valve means for association with fluid pressure supply and return conduits for a device actuated by fluid pressure from a source, a chamber having a movable wall, said chamber on one side of the wall arranged to be connected to the supply conduit coming from the source and the other side being connected to the supply conduit leading to the actuated device, a bypass around the movable wall, a valve element for controlling the bypass, means for opening the valve element by fluid pressure in the return conduit coming from the actuated device, and an operator-operated member connected to the valve element to open it at will by operator effort.

23. In a valve means for association with fluid pressure supply and return conduits for a device actuated by fluid pressure from a source, a chamber having a movable wall, said chamber on one side of the wall arranged to be connected to the supply conduit coming from the source and the other side being connected to the supply conduit leading to the actuated devices, a bypass around the movable wall, a valve element for controlling the bypass, means for opening the valve element by fluid pressure in the return conduit coming from the actuated device, a shaft having an eccentric portion, a handle for rotating the shaft, and means operated by the eccentric portion when the shaft is rotated for opening the valve element.

24. In a valve means for association with a fluid supply conduit leading from a source of pressure to a device to be actuated and having a return conduit interconnecting said device and said valve means, a poppet valve element for closing the pressure supply conduit and being subject to fluid pressure from the source and axially movable off its seat in the direction of flow of fluid through the supply conduit, means associated with the valve element to permit fluid pressure from the source to apply a closing force thereto which is substantially equal to the fluid pressure created force acting to unseat the valve element, a second valve element for closing the return conduit, means for opening said valve elements by fluid pressure in the return conduit, and means for creating fluid pressure in the return conduit prior to the opening of the first valve element.

25. In a valve means for association with a fluid supply conduit leading from a source of pressure to a device to be actuated and having a return conduit interconnecting said device and said valve means, a valve casing for interpositioning in the supply conduit, a poppet valve element in the casing for cutting off the supply conduit, said element having an area subject to fluid pressure from the source and being movable off its seat in the direction of flow of fluid through the supply conduit, means associated with the valve element for establishing an area at the rear thereof which will be opposed to the area of the valve element subject to fluid pressure from the source, means for subjecting said rear area to fluid pressure from the source, a second valve element for closing the return conduit, means for opening the valve elements by fluid pressure in the return conduit, and means for establishing fluid pressure in the return conduit prior to the opening of the first valve element.

26. In a valve, a housing, a first valve chamber therein, a second valve chamber therein, inlet and outlet means for said chambers, a first valve controlling flow in the first chamber, a movable pressure-responsive wall in the second chamber, connections between the first valve and the wall for movement of the valve by the wall, a pressure chamber in the housing, pressure-receiving means in the pressure chamber, means to conduct fluid from the inlet side of the first valve to the pressure chamber, the pressure-receiving means being connected with the first valve to exert a force equal and opposite to the inlet pressure on the first valve, a second valve controlling flow through the second chamber, the connections between the first valve and the wall being interconnected with the second valve to operate the same.

HOWARD E. ROSE.

REFERENCES CITED

The following references are of record in the file of this patent:

UNITED STATES PATENTS

| Number | Name | Date |
| --- | --- | --- |
| 951,172 | Biedermeister | Mar. 8, 1910 |
| 1,045,693 | Gillman | Nov. 26, 1912 |
| 1,775,856 | Hauser | Sept. 16, 1930 |
| 2,021,613 | Sheppard | Nov. 19, 1935 |
| 2,306,346 | Rockwell | Dec. 22, 1942 |
| 2,428,150 | Field | Sept. 30, 1947 |
| 2,478,210 | Sprague et al. | Aug. 9, 1949 |
| 2,493,906 | Wishart | Jan. 10, 1950 |